United States Patent
Gruener et al.

(10) Patent No.: US 12,515,736 B2
(45) Date of Patent: Jan. 6, 2026

(54) METHOD AND DEVICE FOR DETERMINING A CONTROLLER OUTPUT VARIABLE OF A CONTROLLER FOR MANUAL TORQUE CONTROL OF A STEER-BY-WIRE STEERING SYSTEM FOR A VEHICLE

(71) Applicant: Robert Bosch GmbH, Stuttgart (DE)

(72) Inventors: Stefan Gruener, Auenwald (DE); Yang Guo, Chemnitz (DE); Bartosz Kaepernick, Murrhardt (DE)

(73) Assignee: Robert Bosch GmbH, Stuttgart (DE)

( * ) Notice: Subject to any disclaimer, the term of this patent is extended or adjusted under 35 U.S.C. 154(b) by 28 days.

(21) Appl. No.: 18/699,221

(22) PCT Filed: Sep. 19, 2022

(86) PCT No.: PCT/EP2022/075970
§ 371 (c)(1),
(2) Date: Apr. 5, 2024

(87) PCT Pub. No.: WO2023/031703
PCT Pub. Date: Apr. 20, 2023

(65) Prior Publication Data
US 2025/0236333 A1 Jul. 24, 2025

(30) Foreign Application Priority Data
Oct. 11, 2021 (DE) .................... 10 2021 211 421.0

(51) Int. Cl.
B62D 6/00 (2006.01)
(52) U.S. Cl.
CPC .................... B62D 6/008 (2013.01)

(58) Field of Classification Search
CPC ................ B62D 6/007; B62D 6/008
See application file for complete search history.

(56) References Cited

U.S. PATENT DOCUMENTS 7,130,729 B2  10/2006  Shin et al.
7,295,905 B2  11/2007  Yao et al.

FOREIGN PATENT DOCUMENTS

DE  102 54 392 A1  5/2004
DE  10 2019 202 769 A1  9/2020
DE  10 2021 201 141 A1  8/2022

OTHER PUBLICATIONS

Mahtout et al., "Youla-Kucera Based Lateral Controller for Autonomous Vehicle," Nov. 4, 2018, 2018 21st International Conference on Intelligent Transportation Systems, pp. 3281-3286 (Year: 2018).*

(Continued)

Primary Examiner — Lindsay M Low
Assistant Examiner — Charles J Brauch
(74) Attorney, Agent, or Firm — Maginot, Moore & Beck LLP

(57) ABSTRACT

A method is for determining a controller output variable of a control unit having a controller for a controlled system, more particularly for manual torque control of a steer-by-wire steering system for a vehicle. The method includes adjusting a specified controller property of the controller using a specified adjustment portion, and continuously changing an influence of the specified adjustment portion on the controller property based on a parameter. The parameter is determined based on an operating situation of the controlled system, more particularly a steering and/or driving situation of the vehicle. The controller output variable is determined using the controller.

12 Claims, 2 Drawing Sheets

(56) References Cited

OTHER PUBLICATIONS

International Search Report corresponding to PCT Application No. PCT/EP2022/075970, mailed Jan. 23, 2023 (German and English language document) (6 pages).
Mahtout et al., "Youla-Kucera Based Lateral Controller for Autonomous Vehicle", 21st International Conference on Intelligent Transportation Systems (ITSC), IEEE, Maui, Hawaii, Nov. 4-7, 2018 (6 pages).

* cited by examiner

METHOD AND DEVICE FOR DETERMINING A CONTROLLER OUTPUT VARIABLE OF A CONTROLLER FOR MANUAL TORQUE CONTROL OF A STEER-BY-WIRE STEERING SYSTEM FOR A VEHICLE

This application is a 35 U.S.C. § 371 National Stage Application of PCT/EP2022/075970, filed on Sep. 19, 2022, which claims the benefit of priority to Serial No. DE 10 2021 211 421.0, filed on Oct. 11, 2021 in Germany, the disclosures of which are incorporated herein by reference in their entirety.

The disclosure proceeds from a method and device for determining a controller output variable of a controller, more particularly for manual torque control of a steer-by-wire steering system for a vehicle.

BACKGROUND

In steer-by-wire steering systems, a desired steering feel for a driver is generated by a control process. A corresponding actual moment is thereby measured and returned to a controller. The desired steering feel is in this case represented by a desired moment that is supplied to the controller. The controller calculates a corresponding output signal so that the actual moment is the same as the desired moment, ideally at all times. In this case, the controller is designed to satisfy a defined specification for the controller. This specification typically includes several target variables, e.g., effective guidance behavior, sufficient interference suppression, sufficient robustness, haptic stability, etc. Using a controller featuring clear calibration and/or parameterization, it is very difficult to meet all specified targets at the same time, because they are typically not independent of one another and therefore require compromises.

Therefore, a controller that is adaptable to an operational situation and satisfies the corresponding desired targets, particularly with respect to effective guidance behavior, sufficient interference suppression, sufficient robustness, and/or haptic stability is desirable.

DE 10 2019 202 769 A1 relates to the movement control of an automobile by means of a control process. One aim of this control process is to achieve effective guidance, i.e., to optimize the control deviation between the target and actual values.

U.S. Pat. No. 7,130,729 B2 relates to an adaptive compensation of a rear axle steering control by means of vehicle dynamic parameter estimation using a gain scheduler. The latter is achieved as a predefined function of parameters of the vehicle and is implemented in parallel to a controller unit in an open circuit, whereby a variable is determined on the basis of a sum of a variable of the controller unit and a variable of the gain scheduler.

In contrast, it is desirable to provide a control concept that is capable of satisfying multiple conflicting targets with various compromises that are matched to steering and driving situations. In this context, of particular interest are targets that relate to the guidance, as well as to other target variables that cannot be chronologically quantified by means of system signals. Examples of such target variables are, e.g., haptic abnormality or robustness.

SUMMARY

The object of the disclosure is achieved by means of a device and a method as disclosed herein.

A transfer function of a closed control circuit characterizes various target variables along with amplitude and phase in certain frequency ranges, e.g., guidance behavior, haptic abnormality, or robustness. In the procedure described in DE 10 2019 202 769 A, the gain scheduler is located in the path of the actual values. In other words, the gain scheduler does not linearize system behavior in the closed control circuit. In other words, it may be that the robustness, e.g., when increasing a gain of the gain scheduler using a gain scheduling parameter, is first improved, but will then deteriorate upon further increase. Therefore, it is difficult to indicate in which direction the gain scheduling parameter should be changed in the gain scheduler in order to increase robustness. In contrast, due to its adjustment, the closed control circuit behavior by the device and the method disclosed herein is linearly based on the gain scheduling parameter. A relationship between a target variable and a gain scheduling parameter is therefore monotonic.

The method provides that a controller output variable of a control unit having a controller for a controlled system is determined, more particularly for manual torque control of a steer-by-wire steering system for a vehicle, whereby a specified controller property of the controller is adjusted by means of a specified adjustment portion, whereby an influence of the specified adjustment portion on the controller property is continuously changed on the basis of a parameter, the parameter being based on an operational variable of the control distance, more particularly a steering and/or driving situation of the vehicle, and the controller output variable being determined by means of the controller. The controller is thereby operated using a situationally dependent controller calibration and, on the basis of steering and/or driving situations of the vehicle, continuously adjusts the controller properties without thereby creating discontinuities that, e.g., a driver of the vehicle perceives.

Preferably, it is provided that the specified adjustment portion be determined on the basis of an operational variable of the controller.

It is preferably provided that the controller output variable is determined on the basis of a transfer function of the control unit, whereby the transfer function is defined on the basis of a coprime factorization of the controlled system, and the adjustment portion is parameterized using Youla parameterization, whereby the Youla parameterization is scaled by the parameter. As a result, a stability of a closed control circuit, which comprises the controller and the controlled system, is guaranteed despite the adjustment of the controller properties or a re-calculation of the controller. It is thereby possible to continuously change the controller properties without a shifting operation while ensuring the stability of the control circuit.

It is preferably provided that at least one transfer behavior of the control circuit, which comprises the control unit and the controlled system, more particularly an interference suppression, is modified by the parameter and at least one other transfer behavior is not. As a result, the target variables resulting from the steering and/or driving situations of the vehicle are continuously and individually achieved by the controller.

It is preferably conceivable that a gradient of the parameter not be limited. In other words, the gradient need not be limited. As a result, a dynamic of the parameter can be selected as desired without inducing instability.

In addition, a device is provided which is designed to produce a controller output variable of a control unit having a controller for a controlled system, more particularly for manual torque control of a steer-by-wire steering system for a vehicle, to determine whereby the device is designed to adjust a specified controller property of the controller by a specified adjustment portion; to continuously change an influence of the specified adjustment portion on the controller property on the basis of a parameter; to determine the parameter on the basis of an operating situation of the controlled system, more particularly a steering and/or driving situation of the vehicle; and to determine the controller output variable by means of the controller.

It can be provided that the device be designed to determine the specified adjustment portion on the basis of an operational variable of the controller.

It can be provided that the device is designed to determine the controller output variable on the basis of a transfer function of the control unit, in which case the transfer function is defined by a coprime factorization of the controlled system, and the adjustment portion is parameterized using a Youla parameterization, the device being designed to scale the Youla parameterization by means of the parameter.

It can be provided that the device be designed to modify at least one transfer behavior of the control circuit, which comprises the control unit and the controlled system, more particularly interference suppression, by means of the parameter, and at least one other transfer behavior is not modified.

It can be provided that the device be designed such that a gradient of the parameter is not limited.

The vehicle comprises the device for a control process for the vehicle.

BRIEF DESCRIPTION OF THE DRAWINGS

Further advantageous embodiments follow from the description and the drawings hereinafter. The drawings show.

DETAILED DESCRIPTION

Figure 1:
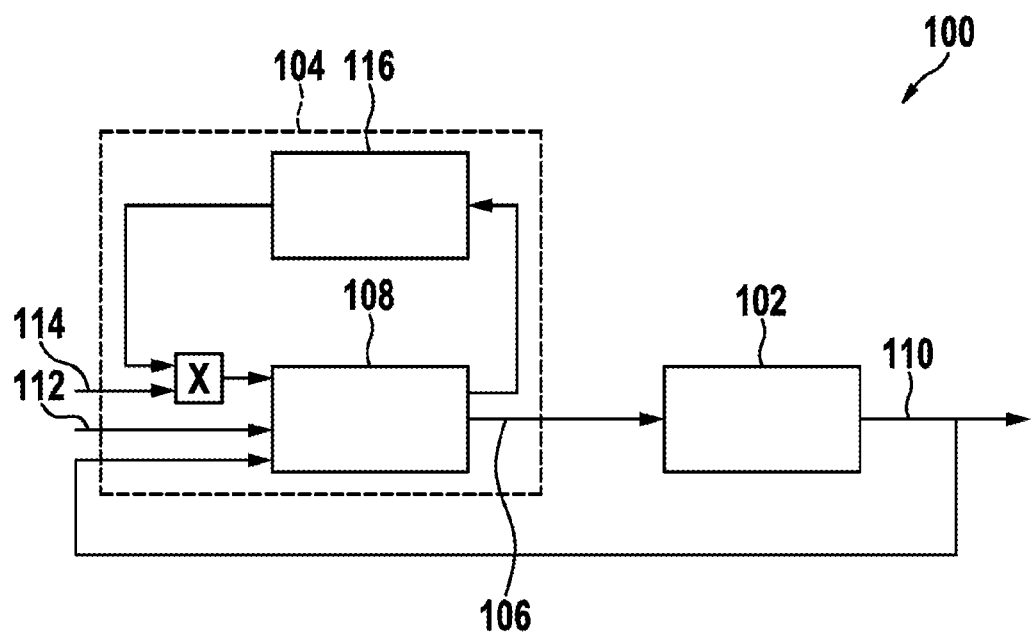
FIG. 1 a schematic representation of part of a steer-by-wire steering system.

FIG. 1 shows a schematic representation of a device 100 for controlling a controlled system 102. The device 100 comprises a control unit 104 that provides a controller output 106 to the controlled system 102 by means of a controller 108. The control process is described hereinafter using the example of a manual torque control of a steer-by-wire steering system. The controller output variable 106 in the example characterizes a motor torque for the manual torque adjuster of the steer-by-wire steering system. A signal from the steer-by-wire steering system characterizing an actual moment 110 of the manual torque adjuster is provided to the controller 108 as an input variable. In addition, a desired torque 112 for the desired manual torque and a parameter 114, which is also hereinafter referred to as parameter Γ, are supplied to the controller 108 as further input variables.

A specified controller property of the controller 108 is adjusted by means of a specified adjustment portion 116. An impact of the specified adjustment portion 116 on the controller property is continuously changed by means of the parameter Γ. The parameter Γ is determined on the basis of an operating situation of the steer-by-wire steering system, more particularly a steering and/or driving situation of the vehicle. As a result, a controller property appropriate for the operating situation is selected.

When adjusting the controller property by the parameter Γ, the intention is to ensure that a control circuit comprising the control unit 104 and the controlled system 102 remains stable. For this purpose, the controlled system 102 is broken down using coprime factorization as follows:

$$G_{(s)} = \frac{N(s)}{M(s)},$$

where the controlled system 102 is designated G(s) and the transfer functions N(s) and M(s) are stable. Due to the coprime property, further stable transfer functions X(s) and Y(s) exist, so the Bezout identity is applicable:

$$N_{(s)}X_{(s)} + M_{(s)}Y_{(s)} = 1$$

Any control unit comprising the following transfer matrix K(s):

$$K_{(s)} = \left( \frac{K_{ff}(s)}{Y(s) - N(s)Q(s)} \quad \frac{X(s) + M(s)Q(s)}{Y(s) - N(s)Q(s)} \right),$$

parameterized using a specified stable transfer function $K_{ff}(s)$ and using any desired stable transfer function Q(s), will stabilize the controlled system G(s) and thereby also the control circuit. The stable transfer function Q(s) represents the adjustment portion 116. The controller 108, which together with the transfer function Q(s) yields the transfer matrix K(s), features the following transfer matrix J(s):

$$J(s) = \begin{pmatrix} \frac{N(s)}{Y(s)} & \frac{N(s)K_{ff}(s)}{Y(s)} & \frac{1}{Y(s)} \\ \frac{1}{Y(s)} & \frac{K_{ff}(s)}{Y(s)} & \frac{X(s)}{Y(s)} \end{pmatrix}$$

The transfer function Q(s) in the form of the adjustment portion 116 is parameterized using a Youla parameterization in the example, whereby the Youla parameterization is scaled by means of the parameter Γ. The controller 108 is designed in accordance with the procedure described hereinabove, thus enabling the controller properties of the control unit 104 to be adjusted via the parameter Γ. The stability of the control circuit is thereby maintained.

Accordingly, the result is obtained by the control unit 104 from the specified controller 108, which is combined with the adjustment portion 116 scaled by means of the parameter Γ according to the Youla parametrization. For example, the adjustment portion 116 is specified by taking into account a steering and/or driving situation of the vehicle or determined on the basis of an operational variable of the controller 108.

Figure 2:
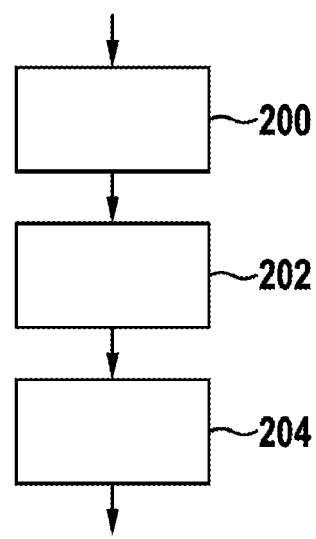
FIG. 2 a flow diagram of a method for determining a controller output variable of a controller, FIG. 3 a schematic representation of part of a vehicle.

FIG. 2 shows a flow chart of a method for determining the controller output variable 106 of the controller 108 for manual torque control of the steer-by-wire steering system for a vehicle. In step 200, an operating situation of the controlled system is determined in the form of a steering and/or driving situation of the vehicle.

In step 202, on the basis of the operating situation, the parameter Γ is determined and, on the basis of the parameter, the influence of the adjustment portion 116 is changed, thereby adjusting the controller property.

The specified adjustment portion 116 is, e.g., determined on the basis of one of the operational variables of the controller 108.

In step 204, the controller output variable 106 of the controller 108 is determined by means of the controller 108 using the previously adjusted controller property and provided to the steer-by-wire steering system.

The controller output variable 106 is determined in the example on the basis of the transfer function $K(s)$ from the control unit 104.

The transfer function $K(s)$ is defined on the basis of a coprime factorization of the controlled system 102, i.e., in the example $G(s)$. In the example, the adjustment portion 116 is parameterized using Youla parameterization $Q(s)$. The Youla parametrization $Q(s)$ is scaled in the example by means of the parameter 114.

It can be provided that at least one transfer behavior of the control circuit, more particularly interference suppression, is modified by means of the parameter 114, and at least one other transfer behavior is not modified.

It can be provided that the gradient of the parameter 114 not be limited.

Figure 3:
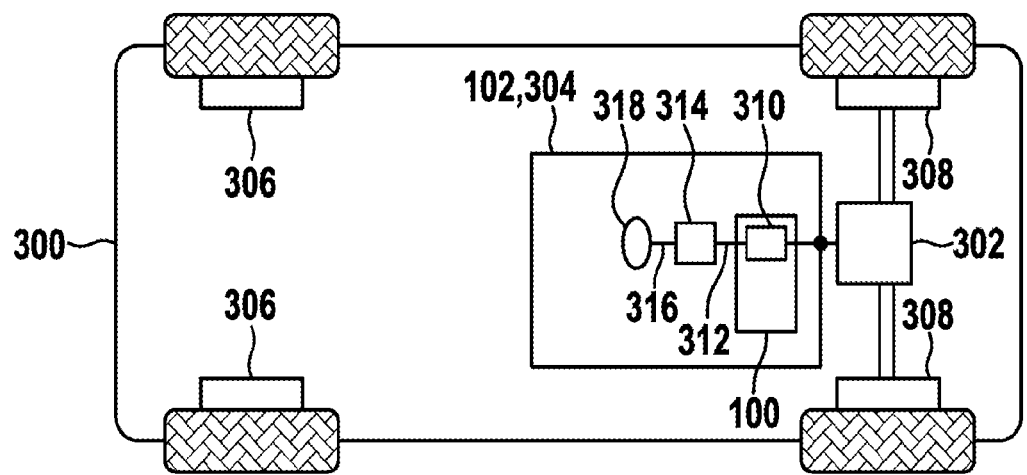

FIG. 3 schematically shows part of a vehicle 300. The vehicle 300 comprises the steer-by-wire steering system. The steer-by-wire steering system comprises a steering system 302 and a manual torque adjuster 304.

In the example, the vehicle 300 comprises two rear wheels 306 and two front wheels 308. In the example, the rear wheels 306 are not steerable. The front wheels 308 in the example are steerable by means of the steering actuator 302.

In addition to the front wheels 308, or instead of the front wheels 308, the rear wheels 306 can also be steerable by means of the rear axle steering actuator.

The manual torque adjuster 304 receives directional input from a driver and creates a steering feel for the driver. To generate the steering feel, the manual torque adjuster 304 comprises a motor 310 that outputs a corresponding motor torque to a rotor shaft 312, which is then transmitted to a steering handle 318 via a transmission 314 and a rotor shaft 316. A steering handle is illustrated by way of example as a steering wheel 318.

The vehicle 300 comprises the device 100, and the manual torque adjuster 304 represents the controlled system 102. In the example, the motor 310 is driven by the controller output variable 106 on the basis of the actual moment 110 of the manual torque adjuster 304.

The device and the method have been described using the example of manual torque control of the steer-by-wire steering system for the vehicle 300. The method is also applicable to a controller output variable of a controller for a different controlled system. It can be provided that the device 100 be designed for a controller output variable of a control unit for a different controlled system, more particularly for another part of the steer-by-wire steering system, or another part of the vehicle 300.

The invention claimed is:

1. A method for determining a controller output variable of a control unit for a controlled system, the control unit having a controller and a specified adjustment portion, the method comprising:
   generating, with the specified adjustment portion, an adjustment signal;
   receiving, with the controller, a desired output variable and the adjustment signal from the specified adjustment portion, a specified controller property of the controller being adjusted based on the adjustment signal;
   continuously changing an influence of the specified adjustment portion on the specified controller property by scaling the adjustment signal from the specified adjustment portion with a parameter;
   determining the parameter based on an operating situation of the controlled system; and
   determining the controller output variable using the controller.

2. The method according to claim 1, wherein the specified adjustment portion is determined based on an operational variable of the controller.

3. The method according to claim 1, wherein:
   the controller output variable is determined based on a transfer function of the control unit,
   the transfer function is defined by a coprime factorization of the controlled system,
   the specified adjustment portion is parameterized using a Youla parameterization, and
   the Youla parameterization is scaled based on the parameter.

4. The method according to claim 1, further comprising:
   modifying at least one transfer behavior of a control circuit comprising the control unit and the controlled system by the parameter,
   wherein at least one other transfer behavior of the control circuit is not modified.

5. The method according to claim 1, wherein a gradient of the parameter is not limited.

6. A device for determining a controller output variable of a control unit for a controlled system, the control unit having a controller and a specified adjustment portion, the device configured to:
   generate, with the specified adjustment portion, an adjustment signal;
   receive, with the controller, a desired output variable and the adjustment signal from the specified adjustment portion, a specified controller property of the controller being adjusted based on the adjustment signal;
   continuously change an influence of the specified adjustment portion on the specified controller property by scaling the adjustment signal from the specified adjustment portion with a parameter;
   determine the parameter based on an operating situation of the controlled system; and
   determine the controller output variable using the controller.

7. The device according to claim 6, wherein the device is configured to determine the specified adjustment portion based on an operational variable of the controller.

8. The device according to claim 6, wherein:
   the device is configured to determine the controller output variable based on a transfer function of the control unit,
   the transfer function is defined by a coprime factorization of the controlled system,
   the specified adjustment portion is parameterized using a Youla parameterization, and
   the device is configured to scale the Youla parameterization using the parameter.

9. The device according to claim 6, wherein the device is configured to modify at least one transfer behavior of a control circuit comprising the control unit and the controlled system using the parameter, and not to modify at least one other transfer behavior of the control circuit.

10. The device according to claim 6, wherein the device is configured such that a gradient of the parameter is not limited.

11. A vehicle, comprising:
a device according to claim 6.

12. The method according to claim 1, wherein the operating situation is a steering and/or driving situation of a vehicle including the controlled system.

* * * * *